March 10, 1925.
C. E. DORSEY
SKIDDER AND HOISTING ATTACHMENT FOR TRACTORS
Filed May 26, 1923
1,529,578
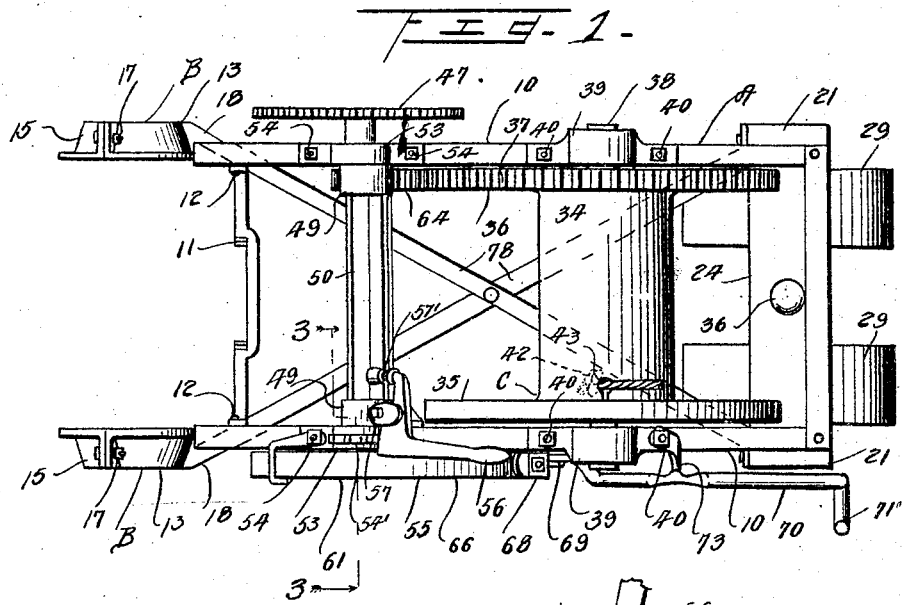
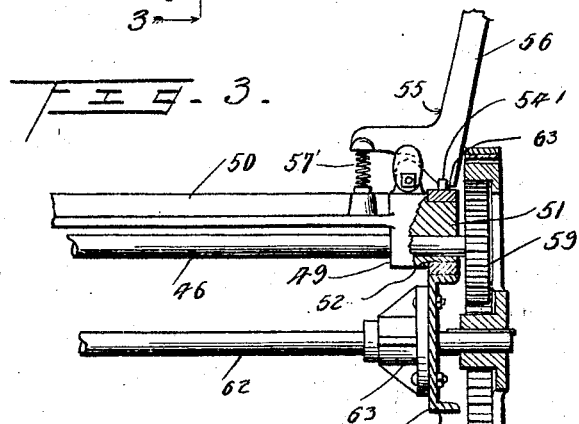
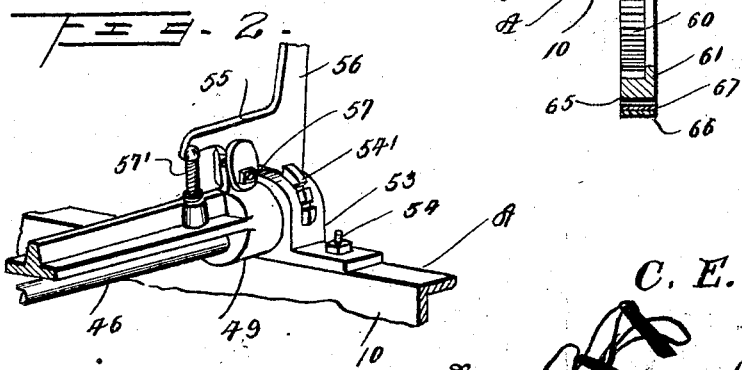
Inventor
C. E. Dorsey.
By
Attorney Patented Mar. 10, 1925.

1,529,578

UNITED STATES PATENT OFFICE.

CLAUDE E. DORSEY, OF ELBA, ALABAMA.

SKIDDER AND HOISTING ATTACHMENT FOR TRACTORS.

Application filed May 26, 1923. Serial No. 641,639.

*To all whom it may concern:*

Be it known that I, CLAUDE E. DORSEY, a citizen of the United States, residing at Elba, in the county of Coffee and State of Alabama, have invented certain new and useful Improvements in Skidder and Hoisting Attachments for Tractors; and I do hereby declare the following to be a full, clear, and exact description of the invention, such as will enable others skilled in the art to which it appertains to make and use the same.

This invention relates to a skidder and hoisting attachment for tractors.

It generally aims to improve, simplify and render more efficient the construction of stump pulling and skidder attachments for tractors.

Particularly it is aimed to provide novel means whereby the leverage and torsion applied to the drum or windlass may be materially increased; to provide a construction wherein the gearing is greatly simplified and includes a novel eccentric mounting for the power or master shaft to enable it to be rapidly thrown into and out of driving relation with the associated parts; to provide a form in which the ground wheels have novel connection with the steering gear of the tractor; to provide novel means for connection of the attachment to the tractor; to provide a novel gear arrangement, whereby a gear in combination with novel means may serve as the braking mechanism; and to provide a construction of the novel and compact form disclosed in accompanying drawings and to be pointed out more in detail hereinafter.

Additional objects and advantages will be pointed out or become apparent from a consideration of the following description taken in connection with said drawings.

In said drawings:—

Figure 1 is a plan view;

Figure 2 is a detail perspective view particularly illustrating the eccentric and adjustable mounting for the drive or master shaft; and Figure 3 is a sectional view taken on the plane indicated by the line 3—3 of Figure 1.

Like reference characters designate like or similar parts in the different views.

In reducing the invention to practice, a suitable frame is provided as at A and which consists of side beams 10 of suitable size, and preferably being metallic channeled beams with the flanges disposed horizontally and extending outwardly. Beams 10 adjacent the front of the attachment are connected by a cross bar or beam 11 suitably fastened to the beams 10 for instance by rivets at 12. The forward ends of the beams 10 are adapted for connection in any suitable manner to the tractor and preferably to the rear axle housing. To this end clamps B are carried by the beam 10 and may consist of sections 13 riveted or otherwise rigidly connected at 14 to said beams and also consist of removable sections 15 bolted as at 16 and 17 to the sections 13. The clamps are annular and the bolts 16 and 17 have their axes at right angles to each other whereby when the bolts 17 are removed, the sections 15 may swing on the bolts 16 relative to the sections 13 in order to engage and disengage the rear axle housing referred to. The bolts 17 may be fastened to such a degree as to rigidly connect the bars 10 to the tractor or may be sufficiently loose to enable the bars 10 to swing from such axle as a pivot according to the surface of the ground over which the attachment travels. The attaching portions 18 of the sections 13 intimately fit between the flanges of the beams 10 and are accordingly braced thereby. A cross bar or plate 24 connects the rear ends of side beams 10 to which is swivelly mounted ground wheels 29, 30 indicating a king bolt to which the frame carrying said ground wheels is pivoted to said cross bar or plate 24. The work of the attachment is primarily adapted to be performed by a windlass or drum C. This drum is of spool form as it has a sleeve 34 and end disks or flanges 35 and 36. The periphery of flange 36 is provided with spur gear teeth 37 whereby it forms a gear wheel. A shaft 38 passes through the sleeve 34 and the two are keyed together for unitary movement and the shaft is journaled in suitable bearings 39 fastened as at 40 on the side beams 10. The drum C operates in connection with a cable or other draw element 41 which is attachable thereto in any suitable manner and which for instance may have a knot 42 engageable in a key-hole slot 43 of the sleeve 34 in a well known and obvious manner.

The master or power shaft for the attachment is designated 46 and is adapted to be driven in any suitable manner from the engine of the tractor to which it is attached. To this end, a drive wheel 47 in the form of a sprocket is rigid on shaft 46 and a sprocket (not shown) is adapted to be trained thereover.

Shaft 46 is journaled in arm 49 of an elongated bearing 50 disposed transversely of the frame A. It is to be particularly noted that such shaft 46 is eccentrically journaled in said arms 49. Arms 49 have outward extensions 51 of reduced diameter in order to provide shoulders at 52. Extensions 51 are journaled in auxiliary bearings 53 fastened by bolts or otherwise as at 54 to the side beams 10. The shoulders 52 abut the inner faces of the auxiliary bearings 53 and thus prevent displacement or movement of the bearings 50 along shaft 46. One of the bearings 53 is notched as at 54' so as to selectively receive in said notches, a latch or lock member 55. Latch 55 has an upstanding operating handle 56 and is a lever pivoted by a pin 57 disposed on and transversely of the bearings 50. The lever 25 is urged into engagement with the notches 54 by an expansive coil spring 57' engaging a part of the lever and carried by the bearing 50. When lever 55 is disengaged from the notches 54, it may be swung in a direction longitudinally of its axis so as to thereby turn bearings 50 and due to the eccentric mounting of shaft 46, vary its position.

Shaft 46 has a relatively small gear wheel or pinion 59 keyed thereto. Pinion 59 is adapted to mesh with the teeth 60 of an internal gear wheel 61. Gear wheel 61 is rigid on a shaft 62 disposed transversely of the frame and journaled in suitable bearings 63 thereof. Also, a gear wheel or pinion 64 is keyed on shaft 62 and disposed in constant mesh with the teeth 37. Attention is called to the fact that instead of the gears 37 and 64, that a worm and worm wheel or other form of gearing may be substituted.

Gear teeth 60 are provided on the inner surface of a rim or band 65 of gear wheel 61. The outer surface of said rim 65 is smooth so that the wheel 61 may be utilized as a brake drum. To this end, a flexible metallic brake band 66 surrounds the drum, preferably being lined as at 67 with felt, leather or the like. One end of band 66 is immovably secured to the frame A. Adjacent the other end of band 66, a lug 68 is fastened and in which a link 69 is loosely mounted. Link 69 is pivoted to a lever 70 which in turn is pivoted to one of the beams 10. Lever 70 has a depending pedal as at 71ᵃ so that it may be operated by foot in order to apply braking pressure to the wheel 61 and indirectly to the windlass C. As lever 70 is depressed, it coacts with a series of teeth (not shown) provided on a bar 73 fastened to one of the bolts 40 of one of the bearings 39 and depending from that bearing. Thus as the lever 70 is depressed it successively engages or disengages the teeth on bar 73 and thus automatically holds the lever 70 in position to which it is adjusted. The lever 70 at its pivot has slight lateral movement to permit its engagement or disengagement with the teeth.

Suitable cross braces or bars 78 may be fastened together and to the frame A as at 79.

It is obvious that the parts may be made of any suitable material and are as usual entirely of metal aside from the brake lining 67 and aside from the cable 41 which while usually of metal may nevertheless be a rope or otherwise as preferred.

In operation the wheel 47 is driven by the engine of a tractor by means of a sprocket chain (not shown) and imparts rotative movement to the drive or master shaft 46 which through the medium of gear wheel 59, gear wheel 61, shaft 62, and gear wheels 64 and 37, rotates the windlass or drum C, thus winding the cable 41 about the same and causing such cable to pull stumps, skid material or perform other work, when the free end of the cable is fastened to the work which may be accomplished in any suitable manner as will be obvious. The lever 55 may be operated at any desired time so as to be disengaged from the notches 54' and thereafter be rocked in order to vary the position of shaft 46 and thereby disengage the gear wheel 59 from the teeth 60, so that the windlass or drum will not be driven and will remain idle, which is advantageous when the cable is being paid out for attachment to the object to be pulled or skidded. In the aforesaid or release position, the lever 55 may be fastened in another of the notches 54'. When the windlass or drum C is to be driven, the lever 55 is appropriately operated so as to rock the shaft 46 and restore mesh of the gear wheels 55 and 61, the parts being fastened in that position by engagement of lever 55 in the appropriate notch 54 under urgency of the spring 57'. In order to check the rotation or motion of the drum C, the lever 70 may be operated at its pedal 71' at any desired time in order to contract the brake band 66 about the wheels 61.

Having thus described the invention, what I claim is:—

1. An attachment of the class described having a master shaft, a bearing in which said shaft is journaled, a bearing in which said bearing is eccentrically and adjustably mounted, a latch on one of the bearings coacting with the other bearing to maintain the first mentioned bearing in adjusted position, said latch being movable on an axis transverse to the shaft for engagement and disengagement with the co-acting bearing and power means adapted to be driven from said shaft.

2. An attachment of the class described having a master shaft, a bearing having arms at opposite ends in which said shaft is journaled, said arms having extensions, bearings in which said extensions are eccentrically and adjustably disposed, a lever pivoted and having its axis transverse to the longitudinal axis of the first mentioned bearing, one of the second mentioned bearings having a plurality of notches adapted to receive said lever, and a spring to urge said lever into said notches, and power means controlled from said shaft.

3. An attachment of the class described having a frame provided with side beams, a driven shaft, an internal gear wheel on said shaft, a pinion in mesh with the teeth of the latter gear wheel, a power shaft carrying said pinion, bearings on the side beams, a bearing having arms eccentrically and adjustably disposed in said bearings, the latter shaft being journaled in said arms, said arms having shoulders abutting the adjacent bearings, a latch lever on the second mentioned bearings, one of the first bearings having notches engageable by said lever, and a spring to urge said lever into engagement with said notches.

In testimony whereof I affix my signature in presence of two witnesses.

CLAUDE E. DORSEY.

Witnesses:
W. W. SANDERS,
J. V. WRIGHT.